United States Patent [19]

Schmerling

[11] 4,179,056
[45] Dec. 18, 1979

[54] WIRE-FEEDING MECHANISM
[75] Inventor: Donald W. Schmerling, York, Pa.
[73] Assignee: Chemetron Corporation, Chicago, Ill.
[21] Appl. No.: 893,654
[22] Filed: Apr. 5, 1978

Related U.S. Application Data

[63] Continuation of Ser. No. 714,519, Aug. 16, 1976.
[51] Int. Cl.² .............................................. B65H 17/34
[52] U.S. Cl. .................................................. 226/171
[58] Field of Search ................. 226/170, 171, 172, 173

[56] References Cited
U.S. PATENT DOCUMENTS

| | | | |
|---|---|---|---|
| 1,931,860 | 10/1933 | Cherry | 226/171 |
| 2,875,624 | 3/1959 | Lathrop | 226/171 |
| 3,065,893 | 11/1962 | Basford | 226/172 |
| 3,100,070 | 8/1963 | Smith | 226/171 |
| 3,946,918 | 3/1976 | Babbin | 226/172 X |

*Primary Examiner*—Richard A. Schacher
*Attorney, Agent, or Firm*—Vincent G. Gioia; William J. O'Rourke, Jr.

[57] ABSTRACT

A wire-feeding mechanism comprises a rotatably mounted pulley formed on its edge with a continuous circumferential groove and plural rollers arranged to hold an endless flexible belt against a segment of the edge of the pulley. The belt thus is adapted to hold the wire in the groove as one roller is driven.

5 Claims, 5 Drawing Figures

WIRE-FEEDING MECHANISM

This is a continuation, of application Ser. No. 714,519, filed Aug. 16, 1976.

BACKGROUND OF THE INVENTION

This invention pertains to a wire-feeding mechanism especially adapted to feed flux-cored welding wire, other malleable welding wires, etc. This invention makes no use of pinch rolls and similar devices as are typically employed in such mechanisms.

Prior wire-feeding mechanisms employing pinch rolls and similar devices are described in many patents including U.S. Pat. Nos. 3,093,285, 3,093,727, 3,107,291, and 3,395,308. Prior wire-feeding mechanisms without pinch rolls and similar devices are exemplified in U.S. Pat. Nos. 3,262,622, and 3,506,176.

When malleable wire is fed through pinch rolls and similar devices, particularly knurled rolls as commonly are employed for high traction, the wire is easily distorted into an out-of-circular cross-section, which cannot be accomodated by guide tubes and other components of an arc welding system. One possibility of such distortion is described as "finning" in U.S. Pat. No. 3,107,291.

When studied by electron microscopy, samples of welding wire as thus fed through knurled rolls have exhibited patterned discontinuities attributable to the knurling of the wire by the rolls. Such discontinuities are undesirable.

SUMMARY OF THE INVENTION

One object of this invention is to provide a wire-feeding mechanism of improved design. Another object of this invention is to provide a wire-feeding mechanism especially adapted to drive malleable wire advantageously and with neither distortion nor knurling as discussed above.

These objects and other objects, features, and advantages of this invention may be attained in a wire-feeding mechanism comprising a housing, a pulley formed on its edge with a continuous circumferential groove and rotatably mounted on the housing, plural rollers rotatably mounted on the housing, an endless flexible belt disposed around the rollers, engaged between a first of the rollers and the pulley and between a second of the rollers and the pulley, and engaged against the edge of the pulley, and means for driving the rollers, the pulley, and the belt whereby a wire inserted in the groove between the belt and the edge of the pulley at the first or the roller is held in and fed through the groove where the belt engages the edge of the pulley and emerges from the groove at the second of the rollers.

Further objects, features, and advantages of this invention are evident from the following detailed description of an embodiment of this invention. Such description is made with specific reference to the several accompanying drawings.

DETAILED DESCRIPTION OF THE EMBODIMENT

The drawings illustrate a wire-feeding mechanism 10 designed to be used with conventional arc welding equipment (not shown) including a welding power supply and an arc welding torch. The wire-feeding mechanism 10 generally comprises a housing 12, which contains electronic circuitry to be described hereinafter, a bridge 14, which is mounted on the housing 12, a hub 16, which is mounted on the bridge 14 at an appropriate and convenient inclination, and other components to be described hereinbelow.

Figure 1:
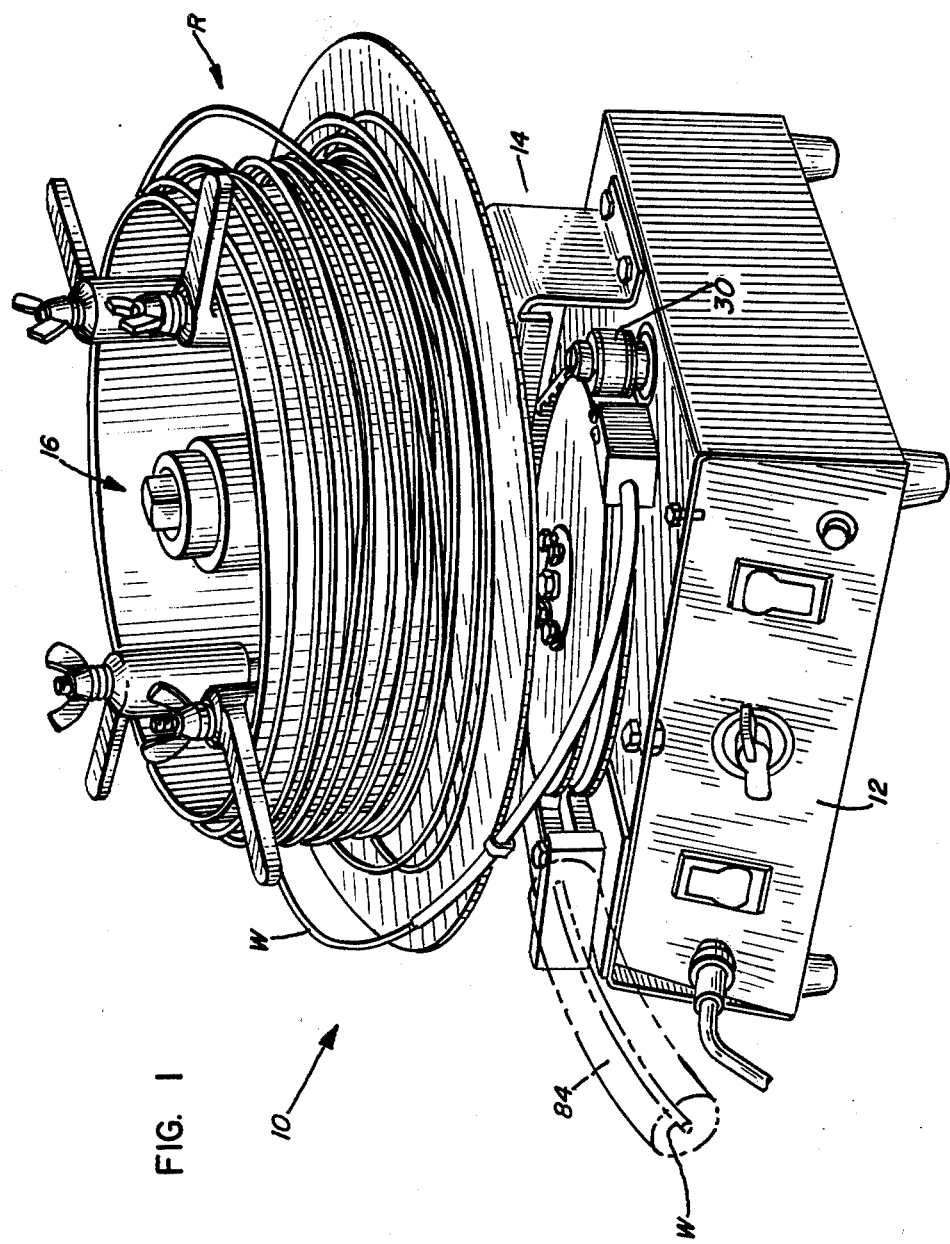
FIG. 1 is a perspective of a wire-feeding mechanism constituting an embodiment of this invention.
Figure 2:
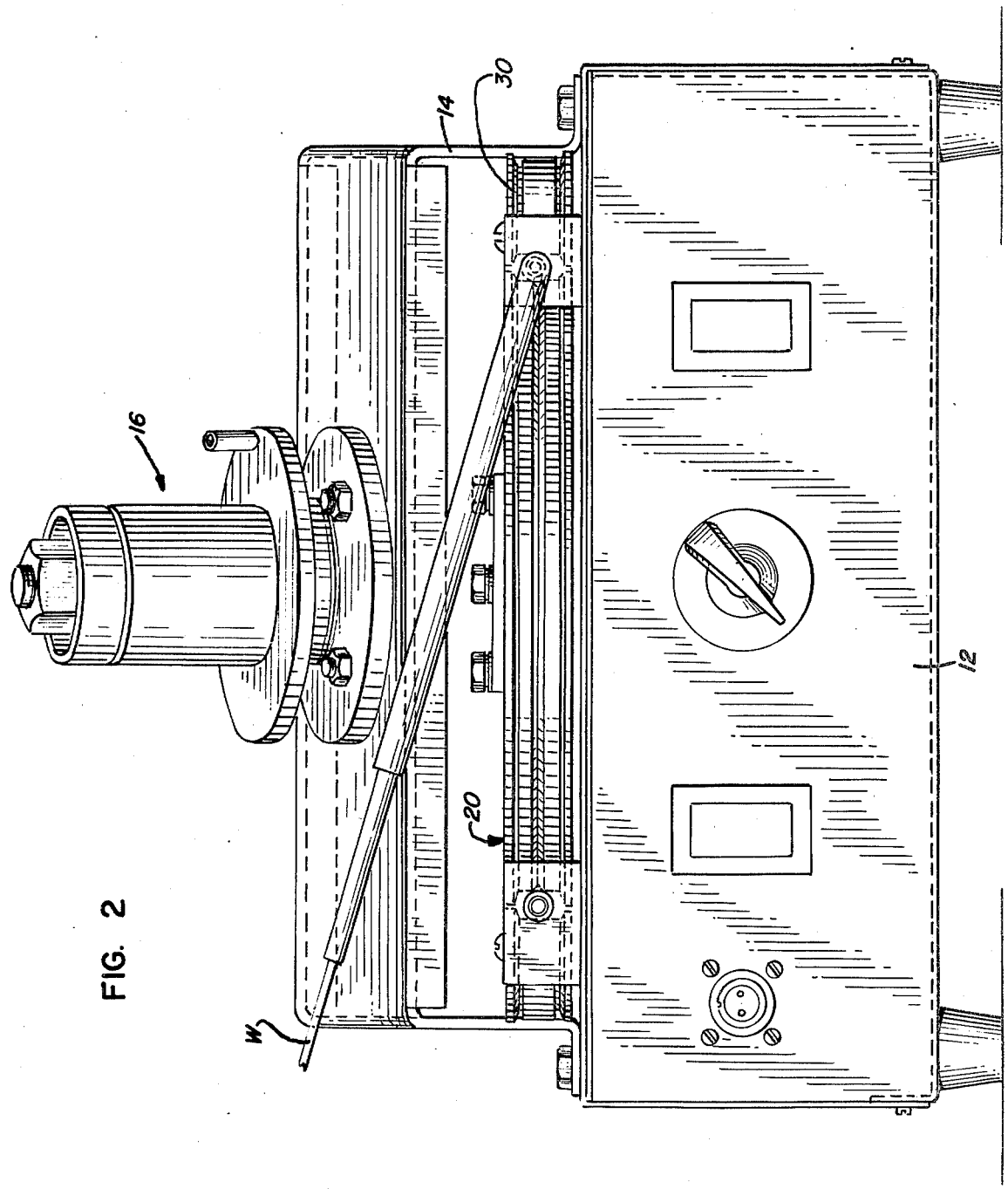
FIG. 2 is a front elevational view of the mechanism with certain components removed for clarity of illustration.

The hub 16 can accomodate, as a supply of welding wire W, either a reel R as shown in FIG. 1 or a spool (not shown) of smaller capacity. The hub 16 and its supply of welding wire W are conjointly rotatable on the bridge 14. A suitable frictional brake may be employed to offset inertial torque in known manner. Because such hubs, reels, spools, and brakes have been used on other wire-feeding mechanisms, further details of these components are deemed unnecessary.

A pulley 20 is rotatably mounted on the housing 12. A generally cylindrical edge 22 of the pulley 20 has lateral flanges 24, which are designed to center a belt to be described hereinbelow, and a continuous circumferential groove 26, which is V-shaped and thus adapted to accomodate a wire of any diameter within an appropriate and convenient range.

Figure 4:
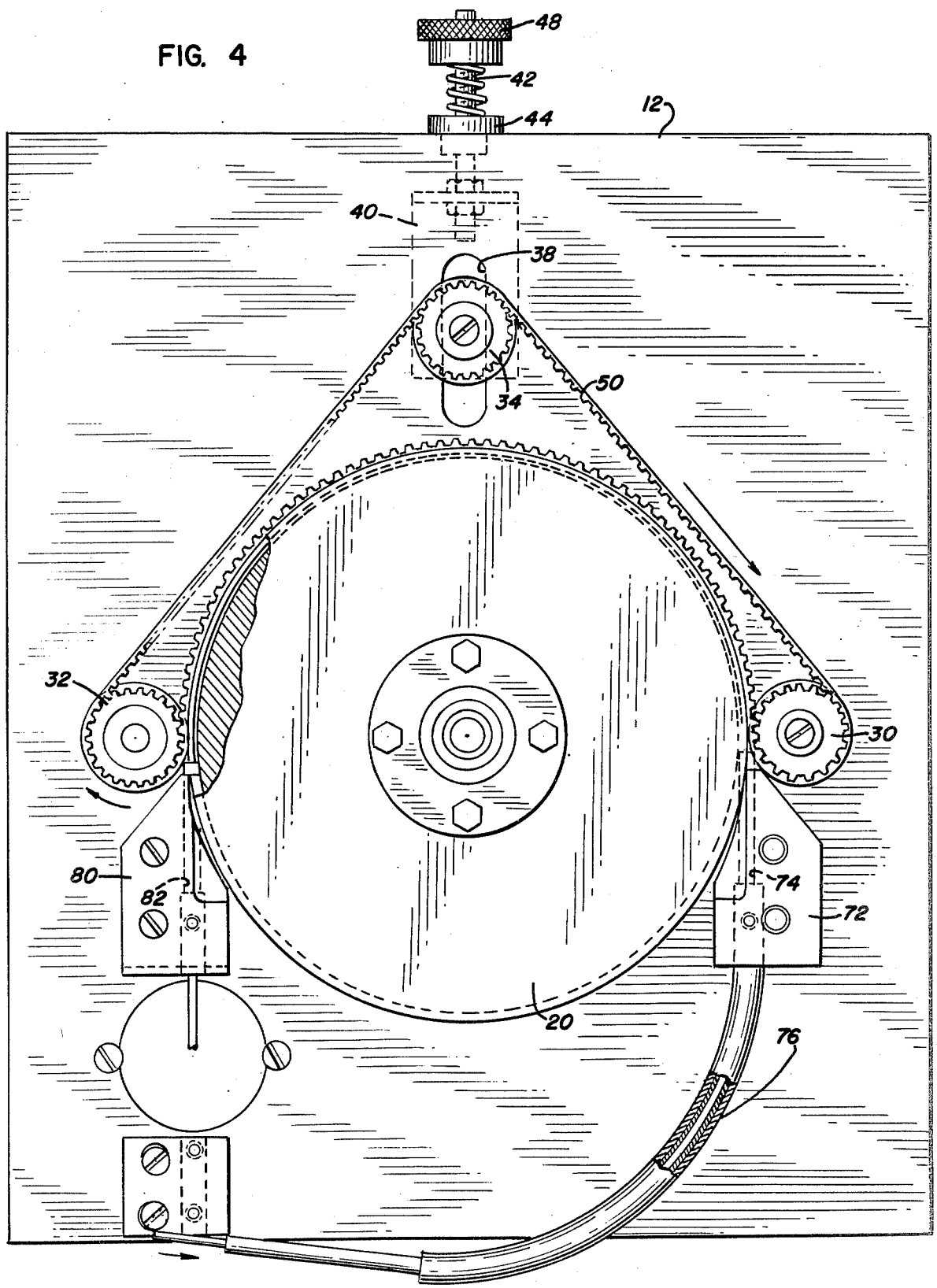
FIG. 4 is a top plan view of the mechanism with additional components removed for clarity of illustration.

A roller 30, a roller 32, and a roller 34 also are rotatably mounted on the housing 12, with their axes parallel to the axis of the pulley 20. As shown in FIG. 4, the roller 30 and the roller 32 are mounted with fixed axes on opposite sides of the pulley 20, and the roller 34 is located behind the pulley 20 and mounted as described hereinbelow.

Figure 3:
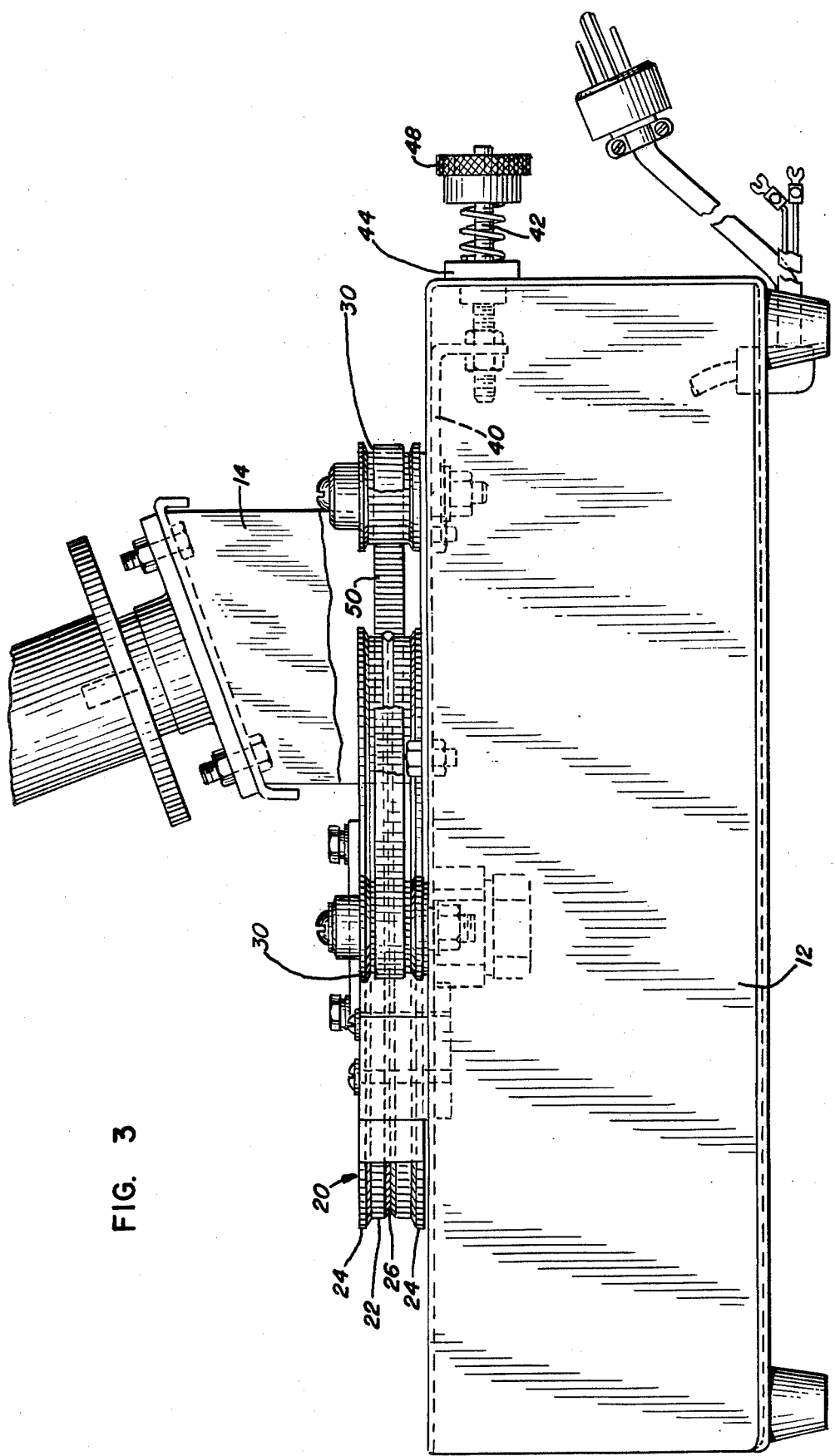
FIG. 3 is a side elevational view of the mechanism as shown in FIG. 2.

As shown in FIG. 3 and FIG. 4, the roller 34 is mounted on a shaft so as to be movable forward and backward as allowed by a slot 38 in the housing 12. The shaft which extends through the slot 38, is carried by a bracket 40, which is movable forward and backward within the housing 12. A screw 42 which is fastened by hex nuts to the bracket 40, extends through a bushing 44 in the wall of the housing 12. A spring 46, which is piloted over the screw 42, is compressed between the bushing 44 and a manually adjustable nut 48 and thus biases the roller 34 backward for a purpose to be described hereinbelow.

An endless flexible belt 50, which may be made of fabric-reinforced synthetic rubber, is disposed around the rollers 30, 32, and 34, between the roller 30 and the pulley 20 and between the roller 32 and the pulley 20, and is engaged against a substantial arcuate segment (approximately 180° as shown) of the edge 22 of the pulley 20. As biased backward, the roller 34 holds the belt 50 in continuous tension. If more tension is desired, the nut 54 is threaded more onto the screw 42. If less tension is desired, the nut 48 is threaded oppositely.

As shown in FIG. 4, the rollers 30, 32, and 34 are toothed, and one face of the belt 50 is lugged so as to interengage with the rollers 30, 32 and 34. Thus, the rotation of the roller 30 as described hereinbelow times and controls the rotation of the roller 34, and the movement of the belt 50. Under proper tension, the belt 50 is pressed against the edge 22 of the pulley 20 with sufficient flexibility to accomodate a wire within the groove 26 yet with sufficient friction to avoid relative slippage of the belt 50 and the pulley 20 and relative slippage of the wire and the groove 26.

The roller 32, which is located where the wire emerges from the groove 26 as described hereinbelow, is driven (clockwise as shown in FIG. 4) so as to draw the wire toward the roller 32 by a motor 60 (FIG. 5) located within the housing 12 and coupled to the roller 32 in conventional manner. Consequently, the belt 50 is driven by the roller 32, and the roller 30 and the roller 34 are driven by the belt 50.

A wire introduced into the groove 22 is self-threading and is pressed tightly against the pulley 20 by the belt 50 as the wire is fed through the groove 26. However, the wire is not under any tension beyond such tension as may have been intentionally provided as by frictional braking of the hub 16. Because the belt 50 is flexible, an out-of-circular condition is not effected on the wire, and the wire is not knurled.

To guide a wire into the groove 26 where the roller 30 causes the belt 50 to engage the pulley 20, a suitably fabricated block 72 having a passage 74 for the wire is mounted to the housing, and a flexible guide tube 76 extends from the passage 74 to conduct the wire as from the reel R. To guide the wire from the groove 22 where the roller 32 causes the belt 50 to engage the pulley 20, a suitably fabricated block 80 having a passage 82 for the wire is mounted on the housing 12 and suitable provision is made to attach a flexible guide tube 84 (phantom lines in FIG. 1) to conduct the wire to an arc welding torch (not shown).

Figure 5:
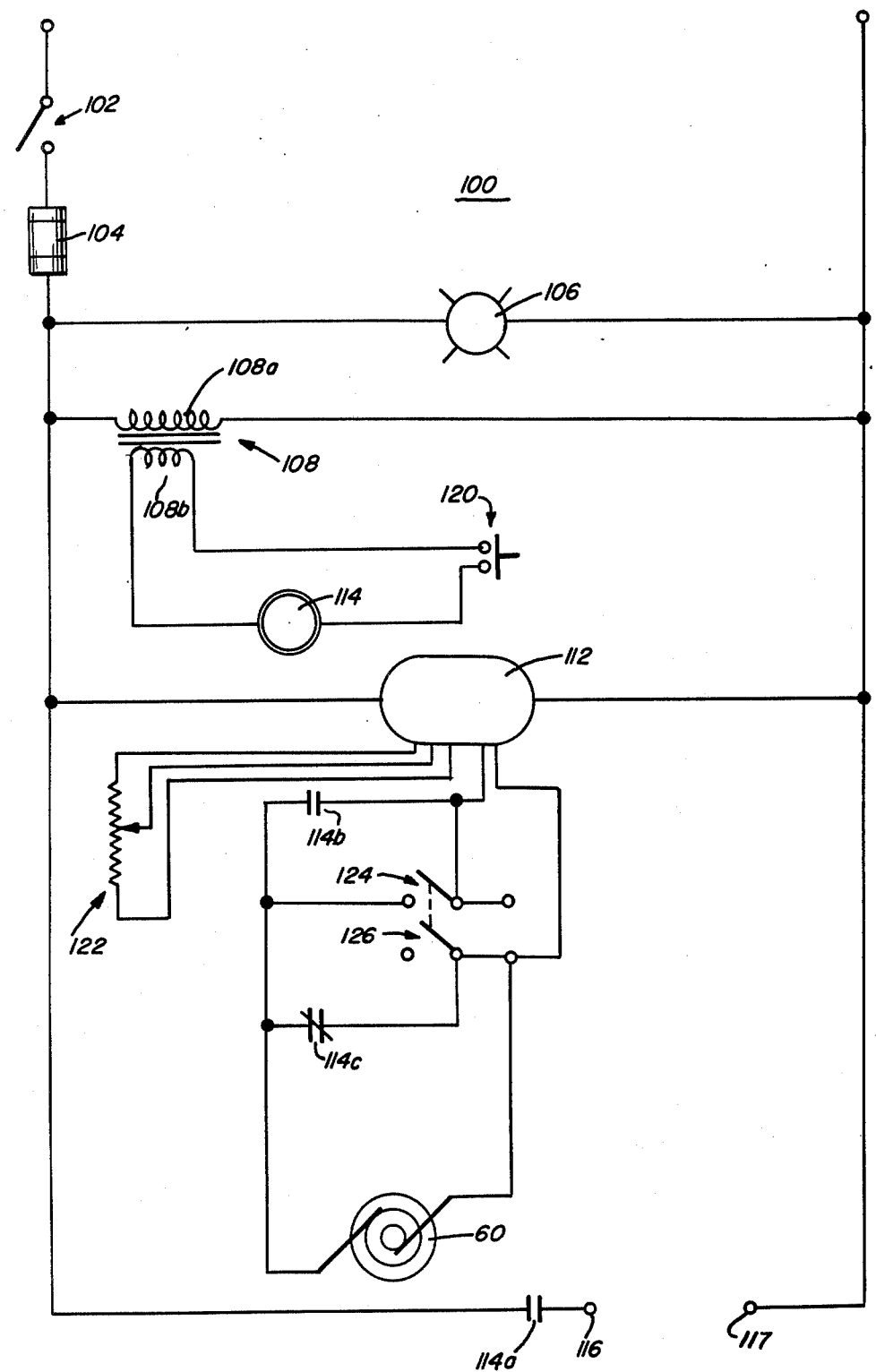
FIG. 5 is a schematic of electrical circuitry of the mechanism.

FIG. 5 shows the circuitry 100 controlling the wire-feeding mechanism 10 and a welding power supply of a type having a conventional contactor circuit as mentioned hereinbelow. Through an on-off switch 102 a conventional circuit breaker 104, line voltage (115 VAC, 60 HZ) from a source (not shown) is applied to three parallel current paths, the first comprising a lamp 106 for indicating that these paths are energized, the second comprising the primary winding 108a of a step-down transformer 108, and the third comprising a motor speed control 112 of conventional type employing a silicon controlled rectifier. In the preferred embodiment a 115 V pilot light #1050A by Industrial Devices, a Stancor #P-8395 24 V, 200 Ma, C.T. transformer, and an SCR speed control RAE #151391 are employed.

Through the on-off switch 102, circuit breaker 104, and normally opened switching contacts 114a of a relay 114 to be described hereinbelow, a voltage essentially equal to line voltage may be applied (at junction 116) to a contractor (not shown) of the welding power supply. The welding power supply having a conventional contactor circuit is enabled to generate an arc only if such voltage is applied to its contactor. The return path at the work-piece to complete the circuit is connected through junction 117 which is further connected to complete the parallel arrangement of the three current paths.

The lowered voltage from secondary winding 108b of the step down transformer 108 energizes the relay 114 through a manually operable switch 120, preferably a normally opened push-button switch in the form of a trigger, which is mounted on an arc welding torch (not shown). This switch provides the dual activation of manual control of the wire-feeding mechanism 10 and the welding power supply.

The output of the motor speed control 112 may be adjusted by a potentiometer 122 and applied to the motor 60 through normally opened switching contacts 114b of the relay 114. It is well known to those skilled in the art that variation in the voltage input of an SCR motor speed controller alters the power and wave form applied to the motor and therefore may be used to vary the corresponding speed of the motor. In the preferred embodiment an Allen Bradley Tupe J 50 K ohm 2 W potentiometer, an RAE motor #103257 and a P&B Relay #KUP14A55 are employed. The contacts 114b may be shunted through a normally open switch 124 ganged with a normally closed switch 126. The motor 60 is normally shunted, and thus rendered inoperative by the switch 126 which is in series connection with normally closed switch contacts 114c of the relay 114.

When the switch 102 is closed but the switch 120 is opened the motor speed control 112 is energized without the contactor of the welding power supply being energized since relay contacts 114a remain open. With the arc disabled switches 124 and 126 energize motor 60 to operate the wire-feeding mechanism 10 and thus allow the wire to be incrementally fed ("inched" in common parlance) without an arc.

When the switch 102 and the switch 120 are both closed, the motor speed control 112 and the contactor of the welding power supply are both energized, which operates the wire-feeding mechanism 10 and enables an arc to be generated by the welding power supply. As long as trigger switch 120 is held closed the arc is maintained and the wire feeding mechanism feeds wire at a rate controlled by the setting of potentiometer 122.

I claim:

1. A wire feeding mechanism for feeding malleable wire comprising:

a housing;

a pulley formed on its edge with a continuous circumferential grove and rotably mounted on said housing;

a plurality of toothed rollers rotatably mounted on said housing;

an endless flexible belt disposed around said rollers and in the same general plane as that defined by the circumferential groove of the pulley, said belt lugged on one face so as to interengage with said rollers, said belt engaged between a first of said rollers and said pulley and between a second of said rollers and said pulley, and engaged against at least a portion of said edge of said pulley and completely overlying the groove over a substantial arcuate segment of the pulley, said belt presenting a continuous smooth face to said edge of said pulley, a third roller mounted within the endless belt to maintain the lugs on the inner face of the belt in spaced relation and to maintain the belt in continuous tension; and means for driving said second of said rollers, whereby said pulley and said belt are driven, and whereby malleable wire inserted into said groove between said belt and said edge of said pulley at said first of said rollers is held in and fed through said groove over said substantial arcuate segment where said belt engages said edge of said pulley and emerges from said groove at said second of said rollers.

2. The mechanism of claim 1 wherein said third roller is adjustably mounted to permit the tension of the belt to be adjusted.

3. The mechanism of claim 1 further comprising guiding means for guiding a wire to said groove where said belt engages said first of said pulleys.

4. The mechanism of claim 1 further comprising guiding means for guiding a wire from said groove where said belt engages said second of said pulleys.

5. The mechanism of claim 4 further comprising guiding means for guiding a wire to said groove where said belt engages said first of said pulleys.

* * * * *